May 19, 1925.   1,538,201

J. D. MONIE

RAT TRAP

Filed Aug. 7, 1924

Inventor
James D. Monie.

By Mason Fenwick & Lawrence
Attorney

Patented May 19, 1925.

1,538,201

UNITED STATES PATENT OFFICE.

JAMES D. MONIE, OF SCRANTON, PENNSYLVANIA.

RAT TRAP.

Application filed August 7, 1924. Serial No. 730,642.

*To all whom it may concern:*

Be it known that I, JAMES D. MONIE, a citizen of the United States, residing at Scranton, in the county of Lackawanna and State of Pennsylvania, have invented certain new and useful Improvements in Rat Traps; and I do hereby declare the following to be a full, clear, and exact description of the invention, such as will enable others skilled in the art to which it appertains to make and use the same.

This invention relates to rat traps and more particularly to a trap which will be provided with a pivoted pan, which in use will be disposed across a rat run so that rats stepping on the same will release the pivoted striker, and consequently get caught.

An object of the invention is to provide an old form of rat trap having a spring tensioned pivoted striker and a detent, together with a trigger and an improved pivoted pan, which will be so arranged that the same will have a cam action on the trigger of the trap to release the pivoted striker when a rat steps upon the said pan.

A further object of the invention is to provide an improved rat trap which will be quite inexpensive to manufacture and highly efficient in use, and which may be used either as a bait trap or a baitless trap depending upon the particular form of pan employed.

Other objects will appear as the description proceeds.

In the accompanying drawings which form a part of my application,

Like characters of reference are used throughout the following specification and the accompanying drawings to designate corresponding parts.

Figure 1:
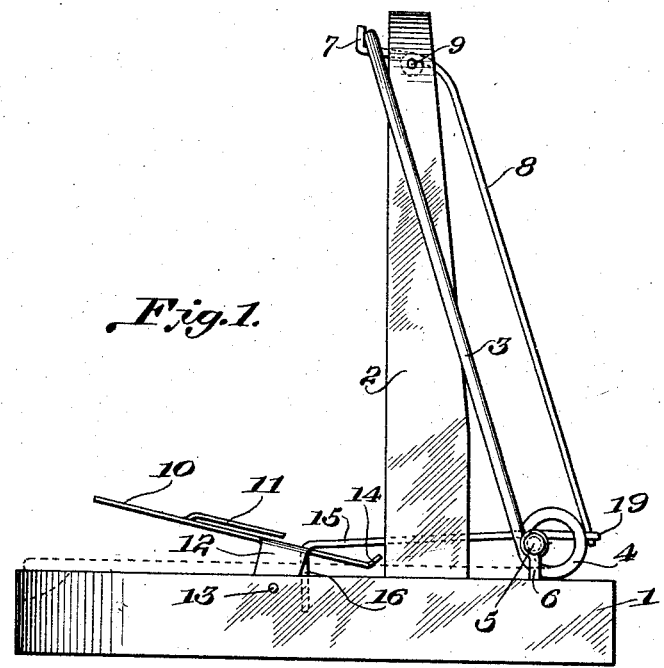
Figure 1 is a side elevation of my improved trap showing the same provided with a bait holding pan.
Figure 2:
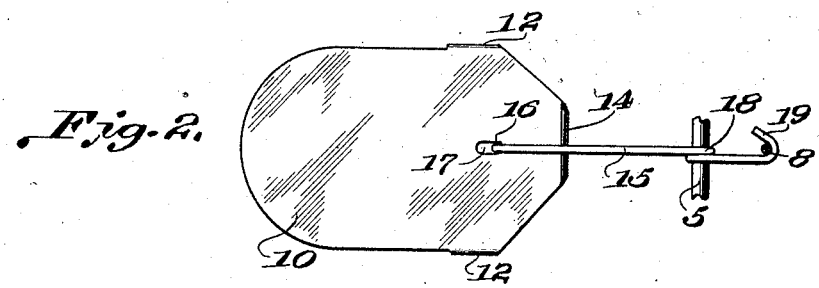
Figure 2 is a plan view of a baitless pan and cooperating trigger.
Figure 3:
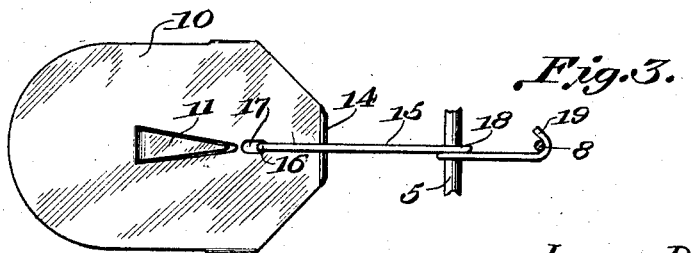
Figure 3 is a plan view of a pan for holding bait showing the cooperating trigger in operative position.

My improved rat trap comprises a base member 1 and an upright standard 2, which extends at right angles to the base as clearly illustrated in Figure 1 of the drawings.

A striker 3 is formed at the end of and is tensioned by the coil spring 4 and is pivoted at 5 to a suitable pivot support 6. The pivoted striker is preferably of loop shape and formation, and is adapted to be drawn to the position shown in Figure 1 of the drawings so that the outer end of the loop is retained adjacent the outer end of the standard 2 by means of the bent end 7 of the detent 8, which is pivoted at 9 through an opening in the standard 2. The opposite end of the detent 8 extends downwardly adjacent the upper surface of the base 1.

My improved pan 10 may be either formed with or without the bait holding means 11 and is provided adjacent one end with the oppositely disposed downwardly extending ears 12, through which a suitable pivot 13 is adapted to extend.

The inner end of the pan 10 is bent upwardly as at 14, the purpose of which will later be fully described.

A trigger 15 is bent downwardly at 16 and extends through an opening 17, which extends through the pan 10 at a point between the ears 12 and the upwardly extending portion 14. The trigger 15 also extends through a slot in the standard 2 and is pivoted at 18 to the pivot rod 5, and terminates at the rear thereof in a hook 19, which is adapted to engage below the lower end of the detent 8.

In operation the trap if used without bait will be placed in a rat's run so that the pan 10 will necessarily have to be crossed, and the pivot striker will be set as illustrated in Figure 1 of the drawings so that the hooked end 7 of the detent 8 will hold the same in position. The trigger 15 will then be set to have its hooked end 19 to engage with the lower end of the detent 8, which operation will cause the outer or free end of the pan 10 to become elevated. As soon as a rat steps upon the pan 10 his weight will cause the same to force the upturned end 14 thereof upwardly against the under surface of the trigger 15 and to exert a cam action thereon, so that the hooked end 19 of the trigger will become disengaged from the lower end of the detent 8, whereupon the resiliently tensioned pivoted striker will snap downwardly and will impinge upon the rat, thereby killing the same.

The operation of the bait trap will be the same as the baitless trap, except that the bait holder 11 will be formed on the pan 10 so that suitable bait may be retained therein.

The main feature or improvement in my invention comprises the bent upward inner end of the pan 10, which is adapted to contact with the under surface of the trigger 15 when weight is applied to the pan, thereby causing a cam action which will release the trigger.

Many minor changes in detail of construction may be resorted to without departure from the spirit of the invention.

I claim:

In a rat trap, the combination of a base and a standard supported thereby, of a pivoted resiliently tensioned striker positioned on one side of said standard, a pivoted detent for holding said striker in said position, a pivoted trigger for engaging a free end of said detent while the same is holding said striker in said position, a cooperating pivoted pan disposed on the opposite side of said standard and having a cam shoulder formed on its end adjacent said standard adapted to release said trigger thereby releasing said striker when weight is applied to said pan.

In testimony whereof I affix my signature.

JAMES D. MONIE.